United States Patent [19]

Green

[11] 4,081,727
[45] Mar. 28, 1978

[54] SPEED CONTROL

[76] Inventor: Aaron F. Green, 1 Holbrook Ct., Rockport, Mass. 01966

[21] Appl. No.: 682,475

[22] Filed: May 3, 1976

[51] Int. Cl.² .............................................. H02P 5/40
[52] U.S. Cl. .................................. 318/230; 318/227; 318/231; 363/63
[58] Field of Search ................. 318/227, 230, 231; 363/63; 323/18

[56] References Cited

U.S. PATENT DOCUMENTS

| | | | |
|---|---|---|---|
| 3,680,760 | 8/1972 | Costa et al. | 318/227 |
| 3,700,987 | 10/1972 | Deering | 318/230 |

Primary Examiner—Herman J. Hohauser

Attorney, Agent, or Firm—Wolf, Greenfield & Sacks

[57] ABSTRACT

Accurate induction motor speed control is accomplished by controlling the duty cycle of operation of high voltage switches which in turn drive the motor windings. For two phase operation logic circuitry generates two bipolar variable duty cycle waveforms with the off-time of each waveform being adjustable to vary motor speed. For single phase operation a single control waveform is generated. An initialization circuit is also provided and forms a part of the circuitry for converting the input AC line voltage to a DC voltage level useable by the high voltage switches. This initialization circuit controls the charging of capacitors of the AC to DC converter and provides efficient power transfer.

16 Claims, 5 Drawing Figures

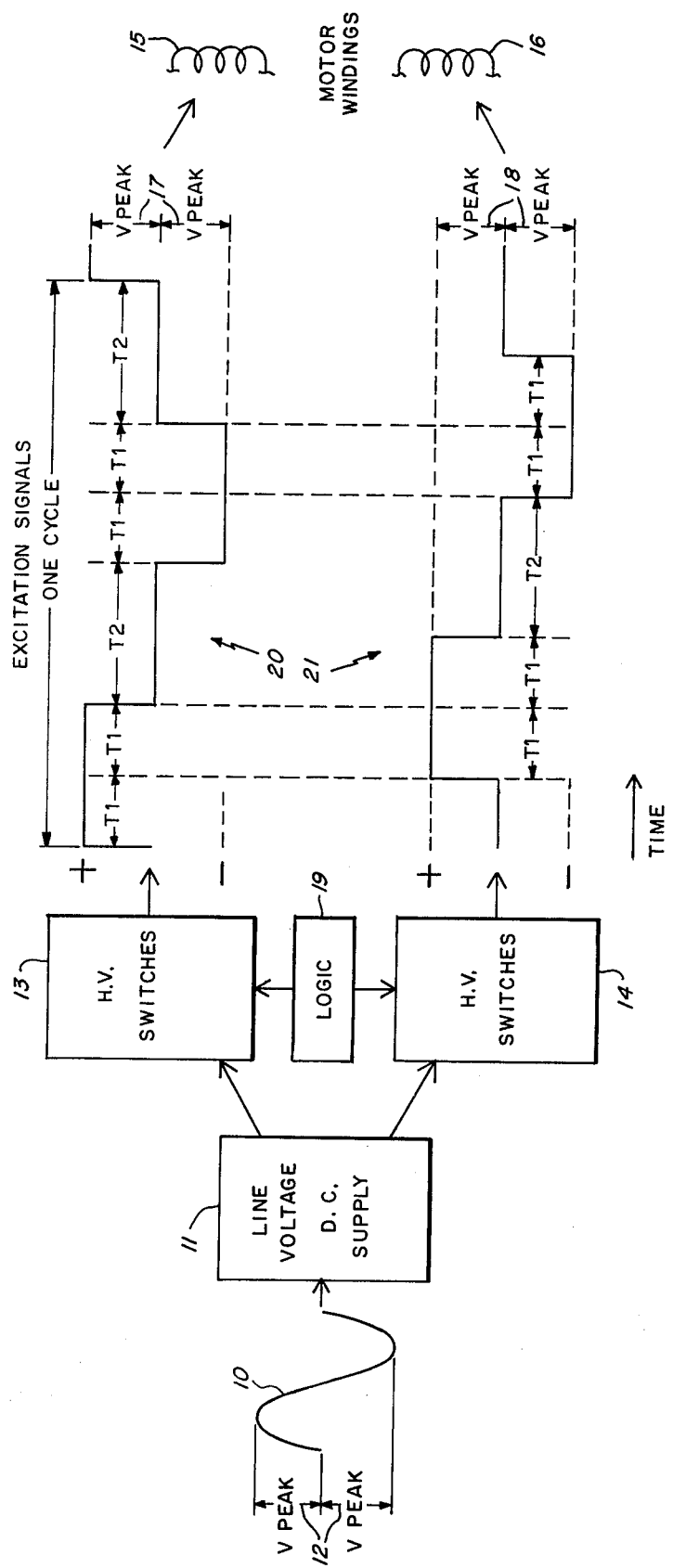

SPEED CONTROL

BACKGROUND OF THE INVENTION

The present invention pertains in general to the speed control of induction-type motors. More particularly, this invention pertains to a speed control technique that permits operation over a wide speed range using variable duty cycle square wave excitation of the motor windings. The principles of this invention are applicable to multi-phase induction motors and also single phase induction motors. This invention also pertains to an improved initialization circuit which controls the high DC voltage applied to one or more high voltage switches which in turn control the current to the motor windings. The initialization circuit may comprise an AC to DC converter for converting, for example, the conventional 110 volt AC input line voltage to higher DC voltage levels.

The motor windings of induction motors have been excited by square waves and means have been provided for controlling the speed of induction motors driven in this manner. Since square wave excitation results in a winding current which varies inversely with frequency these prior art drive techniques have included means for varying, directly with frequency, the voltage impressed on the motor winding or windings.

One known technique for varying the excitation voltage comprises an impedance in series with the motor windings and the high voltage switches of the drive circuitry. One of the disadvantages is that the series impedance must be reduced to a negligible value to achieve high motor speeds and alternatively greatly limits the drive efficiency at lower motor speeds.

Another more elaborate approach to speed control comprises means for varying the DC supply voltage to the high voltage switches of the drive circuitry. This technique is not sufficiently sufficient in its operation. With this technique the efficiency is dependent upon the efficient conversion of line voltage AC to DC of a lower voltage of the line voltage peak value.

Accordingly, it is an object of the present invention to provide an improved apparatus for accurately controlling the speed of an induction motor over a relatively wide speed range.

Another object of the present invention is to provide a speed control apparatus which is characterized by a highly efficient power conversion.

Still another object of the present invention is to provide a speed control circuit for controlling an induction motor and which can be manufactued at a minimum cost.

A further object of the present invention is to provide an improved AC to CD converter which efficiently converts a conventional AC voltage into a DC driving voltage for the high voltage switches which in turn drive the motor winding or windings.

Still another object of the present invention is to provide a speed control technique which is usable with either a single phase motor or a multi-phase motor.

SUMMARY OF THE INVENTION

To accomplish these foregoing and other objects of this invention there is provided an apparatus for controlling the speed of an induction motor having at least one winding. In the disclosed embodiments there is shown a speed control circuit for controlling a two-phase motor and also speed control circuitry for controlling a single phase motor. The speed control apparatus comprises means for receiving an alternating input signal and converting the alternating signal into a DC voltage level, voltage switch means coupled from the converting means, and control means. The voltage switch means receives the DC voltage level from the converting means and has an output coupling to the motor winding. The voltage switch means also preferably has a pair of control inputs. The control means couples to these control inputs and comprises means for generating a bipolar wave form defined in part by an off-time period and means for adjusting the length of this off-time period to control motor speed. The control means is preferably comprised of logic circuitry. The converting means for providing a DC voltage level is preferably comprised of, for example, in a two-phase system, a conventional bridge circuit comprising charging capacitors, and an initialization circuit comprising a zero voltage switch circuit. The initialization circuit provides reliable power-up especially when large charging capacitors are used and provides for the efficient transfer of power through the voltage switch means.

BRIEF DESCRIPTION OF THE DRAWINGS

Numerous other objects, features and advantages of the invention should now become apparent upon a reading of the following detailed description taken in conjunction with the accompanying drawings in which:

FIG. 1 diagrammatically illustrates one arrangement of the apparatus of this invention and shows a block diagram, the motor windings and wave forms associated with the block diagram;

DETAILED DESCRIPTION

Figure 2A:
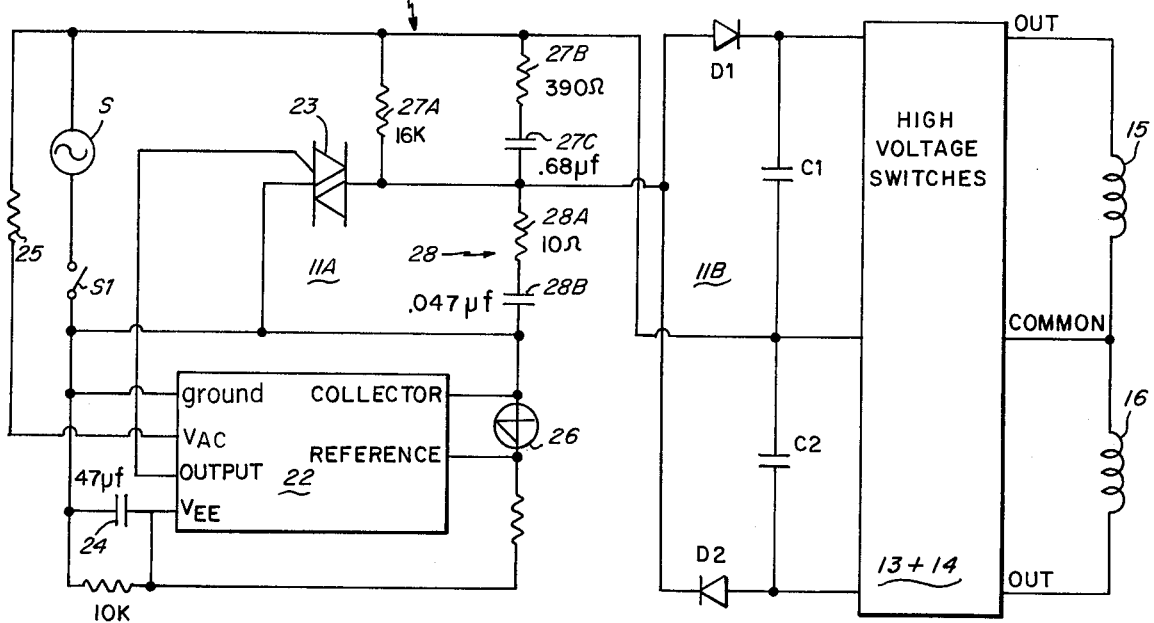
FIG. 2A is a somewhat more detailed circuit and block diagram of a part of the system shown in FIG. 1.

Referring now to FIG. 1 there is shown a waveform 10 which may be conventional 110 volt AC waveform having alternate peaks 12. This voltage waveform is coupled to a converter 11 which provides opposite polarity DC voltage levels. The converter 11 may be referred to as a DC voltage supply and comprises rectifier means including storage capacitors. FIG. 2A discussed hereinafter shows a more specific embodiment for the converter 11.

Figure 2B:
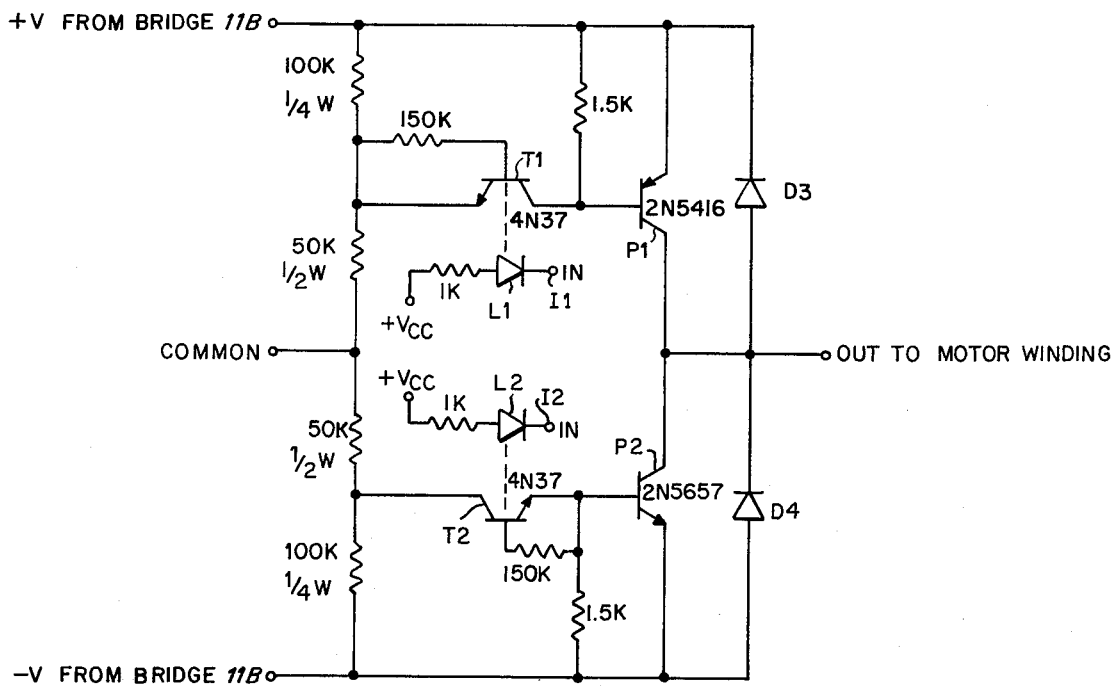
FIG. 2B shows one embodiment for a high voltage switch shown in block form in FIG. 1.

An impedance is maintained between the input to converter 11 and the output of the high voltage switches 13 and 14 which is very much smaller than the impedance of the motor windings 15 and 16 diagrammatically illustrated in FIG. 1. Thus, the peak voltages 17 and 18 associated respectively with waveforms 20 and 21 differ from the peak voltage values 12 by only the saturation voltage of the high voltage switches 13 and 14 plus rectifier and triac "on" voltages. FIG. 2B shows an embodiment for a high voltage switch and is discussed in more detail hereinafter.

FIG. 1 also shows the waveforms 20 and 21 which depict the time dependent aspects of the invention. The high voltage switches 13 and 14 are controlled by the control logic 19 so as to alternately connect the positive and negative busses of high voltage supply 11 to the motor windings 15 and 16, respctively. Each of the switches 13 and 14 conducts for a period of twice T1 and remains off for a period T2. The switch is then operated at its opposite polarity for a similar period twice T1. The time period T2 is adjustable from virtually zero (allowing a few microseconds for high voltage switch turn-off time) to a large value corresponding to slower motor speeds. An optimum value for period T1 is preferably chosen for operation at all speeds. Relatively small adjustments are made to change period T1 and these adjustments may be made dependent on or independent of the time period T2.

This excitation scheme facilitates the transfer of power from the supply 11 to the motor windings (loads) 15 and 16 at peak voltages with are independent of motor speeds. There is therefore a simplification in the power circuitry and high efficiencies of operation are realized with this technique.

The control depicted by the waveforms 20 and 21 may be used for controlling the speed of two-phase motors or permanent, split capacitor induction motors. Furthermore, the concepts may be extended to three-phase induction motors or motors having more than three phases. In the case of three-phase operation the "on" portions of the three excitation signals are divided into three equal periods T1 wherein each period constitutes the phase difference between successive excitation signals.

FIG. 2A shows in detail a preferred embodiment for the converter 11 and the associated high voltage switches and motor windings. FIG. 2B shows an embodiment for one of the high voltage switches. In FIG. 2A the converter 11 comprises an initialization circuit 11A and a bridge charging circuit 11B. The circuit 11A is especially advantageous when the size of the motor necessitates fairly large values of capacitors and, consequently, large initial charging currents at power-up.

The circuit 11A limits initial capacitor surge currents at power-up and comprises a Triac 23 and a zero voltage switch 22. FIG. 2A shows the conventional AC source S and an associated on-off switch S1. The zero voltage switch 22 may be of the type fabricated by Motorola Semi-conductors of Phoenix, Ariz. bearing their part No. MFC8070. The internal identification markings of the device 22 shown in FIG. 2A are the same as those used by Motorola.

The initialization circuit 11A functions as a delay means and the device 22, in particular, allows the Triac 23 to commence conducting only when the line voltage is near zero. It is noted that the output from device 22 couples to the gate electrode of the Triac 23. The delay is provided in effect by inhibiting an output from device 22 for a predetermined period of time. This delay retards the energizing of the capacitors C1 and C2 while the drive logic initializes and switch S1 fully closes.

When the switch S1 is closed the AC power is coupled by way of resistor 25 to one input of device 22. The opposite side of the source S is coupled to an opposite input of the device 22. Circuitry within the device 22 causes a charging voltage at the output $V_{ee}$ which voltage charges capacitor 24. Thus, resistor 25 and capacitor 24 form a delay circuit along with the uni-directional switch 26 and its associated series resistor. The resistor across capacitor 24 is for discharging capacitor 24 at turn-off. The charging voltage at the $V_{ee}$ output of device 22 charges negatively and when a sufficient negative voltage is reached unidirectional switch 26 conducts essentially connecting the collector and reference terminals of device 22. When that occurs device 22 is enabled for operation and at the next zero crossing an output pulse is coupled from device 22 to the gate of Triac 23 for causing the Triac to turn-on.

Network 27 comprises resistors 27A and 27B and capacitor 27C. This network provides a minimum load insuring turn-on of Triac 23 regardless of the voltage on the capacitors C1 and C2. Network 28 comprises resistor 28A and capacitor 28B and provides immunity to turn-on of Triac 23 by commutation transients that may occur.

The circuit shown in FIG. 2A provides for the reliable power-up of large capacitors such as capacitors C1 and C2. With this arrangement surge currents are limited by line frequency charging rates and lossy series impedance is not introduced.

FIG. 2A shows the high voltage switches 13 and 14 which couple between the bridge circuit 11B and the motor windings 15 and 16. FIG. 2B shows one embodiment for one of the switches 13 and 14. Each high voltage switch receives opposite polarity DC voltages from the bridge circuit 11B. In FIG. 2B these are identified as voltages busses plus V and minus V. Each of the voltage switches also receives a common input coupled from bridge 11B and in turn coupled to the common node between the windings 15 and 16 shown in FIG. 2A. The output from the switch shown in FIG. 2B would couple to one of the windings 15 or 16. The control for the switch is by way of inputs I1 or I2 which couple respectively to light emitting diodes L1 and L2 associated with phototransistors T1 and T2, respectively.

The switch shown in FIG. 2B also comprises power transistors P1 and P2. These transistors are operated by their corresponding phototransistors T1 and T2. Thus, when transistor T1 conducts power transistor P1 likewise conducts and the motor winding is driven from the positive bus. On the other hand when transistor T2 is conductive by virtue of the presence of an input signal I2, then the power transistor P2 is also conductive and the negative driving bus is coupled to the motor winding. The motor windings are never pulsed by opposite polarity pulses at the same time because the input signals on input terminals I1 and I2 are exclusive of each other.

Figure 3:
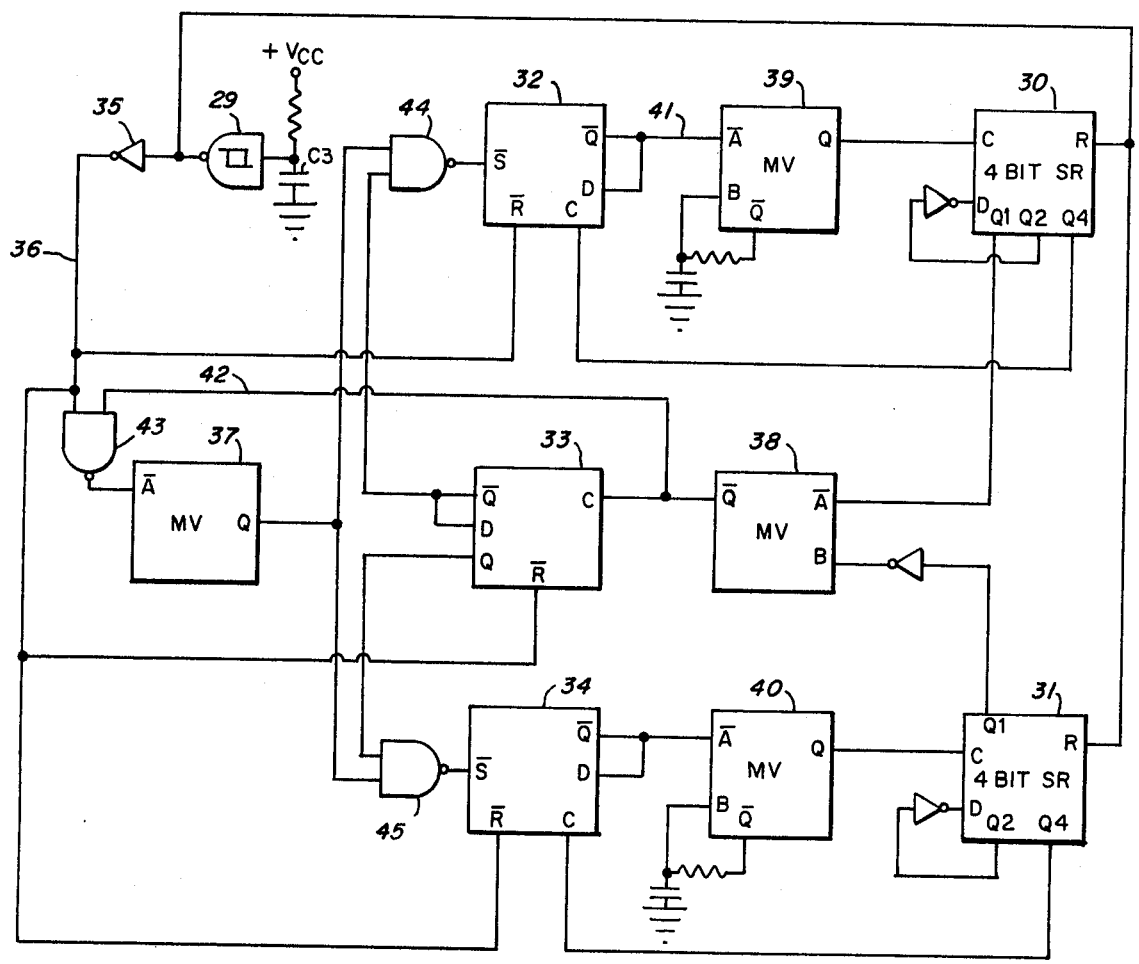
FIG. 3 is a logic block diagram of one embodiment of the control logic of this invention for use with a two-phase induction motor.

Referring now to FIG. 3 there is shown one embodiment for the control logic 19 shown in FIG. 1 the outputs of which couple to the high voltage switches such as the one shown in detail in FIG. 2B. The logic shown in FIG. 3 is operated from conventional voltage levels such as zero and +5 volts. These voltage levels occur, for example, at the time that a switch S1 is closed to commence operation of the apparatus. When this power-up occurs the voltage across capacitor C3 does not instantaneously charge and thus the output from Schmitt trigger 29 is initially high resetting shift registers 30 amd 31. This same resetting signal is coupled by way of inverter 35 and line 36 to flip-flops 32, 33 and 34 for resetting these flip-flops at power-up. The signal on line 36 remains low longer than the respective periods of monostable multivibrators 37, 38, 39 and 40. Multivibrators 39 and 40 are inhibited from self-retriggering by the high outputs 41 and 42 from flip-flops 32 and 34, respectively. The multivibrators 37 and 38 are not configured for self-retriggering. When the voltage across capacitor C3 has charged to a sufficient positive level the signal on line 36 goes high or positive. Multivibrators 37, 38, 39 and 40 are off by the time that this signal on line 36 goes high.

When the signal on line 36 goes positive the rising edge of the signal triggers multivibrator 37 by way of NAND gate 43. The other input to NAND gate 41 by way of line 42 is satisfied because multivibrator 38 is reset and thus its output Q is high. The output from multivibrator 37 couples to NAND gates 44 and 45. These gates are enabled but their output is dependent upon the state of flip-flop 33. The output pulse width from multivibrator 37 need not be very long but need be just sufficiently long to guarantee clocking by way of gates 44 and 45. Because the flip-flop 33 had just been previously reset its outputs are connected such that its negation output enables gate 44 and flip-flop 32 becomes set. The negative going output from flip-flop 32 on line 41 in turn triggers multivibrator 39 which in turn clocks the shift register 30. The inverter coupled between the Q2 output of shift register 30 and the D (data) input of the shift register assures that a "1" is clocked into the first position Q1 of shift register 30.

Multivibrator 39 is configured to self-retrigger by virtue of the feedback network associated therewith including a capacitor and resistor. Thus, additional clock pulses are coupled from multivibrator 39 to the clock input of shift register 30. At the next clock pulse the Q2 output is still low and thus a "1" is clocked into the shift register in the Q1 position. Thus, the Q1 output of shift register 30 is high for two periods of multi-vibrator 39. Upon the occurrence of the next clock pulse from multivibrator 39 the Q1 output from the shift register 30 goes low as the Q2 output is now high. This Q1 output goes low at the beginning of the third period thereby triggering multivibrator 38. The output from multivibrator 38 couples to flip-flop 33 which is also triggered to change its state. After flip-flop 33 is pulsed to change its state then the trailing edge of the pulse from multivibrator 38 via gate 43 again activates multivibrator 37. Because flip-flop 33 has changed its state now gate 45 is enabled rather than gate 44 and upon the generation of the pulse from multivibrator 37 flip-flop 34 becomes set and multivibrator 40 is in turn triggered from flip-flop 34. The flip-flop 34, multivibrator 40 and shift register 31 operates exactly the same as discussed hereinbefore with reference to flip-flop 32, multivibrator 39 and shift register 30. Again, multi-vibrator 40 commences to self-retrigger clocking shift register 31. When the Q1 output of shift register 31 is at its low level this signal is coupled by way of an inverter to multivibrator 38. The inverter is needed because this signal is coupled to an assertion input rather than a negation input as the coupling from shift register 30.

The Q1 and Q2 outputs of shift registers 30 and 31 are used to develop the graphically portrayed waveforms of FIG. 1 identified as signals 20 and 21. The periods of multivibrators 39 and 40 are preferably equal and the period is equal to period T1 shown in FIG. 1. The shift register 30 outputs may control the positive portions of the waveforms shown in FIG. 1 while the shift register 31 outputs may control the negative portions of the waveforms 20 and 21.

For example, regarding shift register 30 the Q1 output is high during the first two T1 periods and then is low. On the other hand the Q2 output from register 30 is low during the first period and is high during the second and third periods and then reverts to its low state. This corresponds with the respective positive waveforms of signals 20 and 21 shown in FIG. 1. If it is assumed that the high voltage switch shown in FIG. 2B is switch 13 then the I1 input couples from output Q1, for example. The other high voltage switch would then have its corresponding I1 input coupled from the Q2 output of shift register 30. Similarly, the I2 input shown in FIG. 2B will couple from the Q1 output of the shift register 31 and the Q2 output from shift register 31 couples to the other I2 input of the second switch 14. The time period of multivibrator 38 which may be varied determines the variable time T2 shown in FIG. 2, it being recalled that multivibrator 37 is only again set in operation at the end of the time period defined by multivibrator 38. Similarly, the timing circuits associated with multivibrator 39 and 40 control the time period T1 which may be changed by varying the predetermined time set by these timing circuits associated with both multivibrators 39 and 40.

In a preferred embodiment, the logic shown in FIG. 3 is implememted with only seven, standard, integrated circuits all of which may be of the CMOS type. The dissipation has been measured at less than 100 milliwatts including the opto-isolator drive for the high voltage switches.

Figure 4:
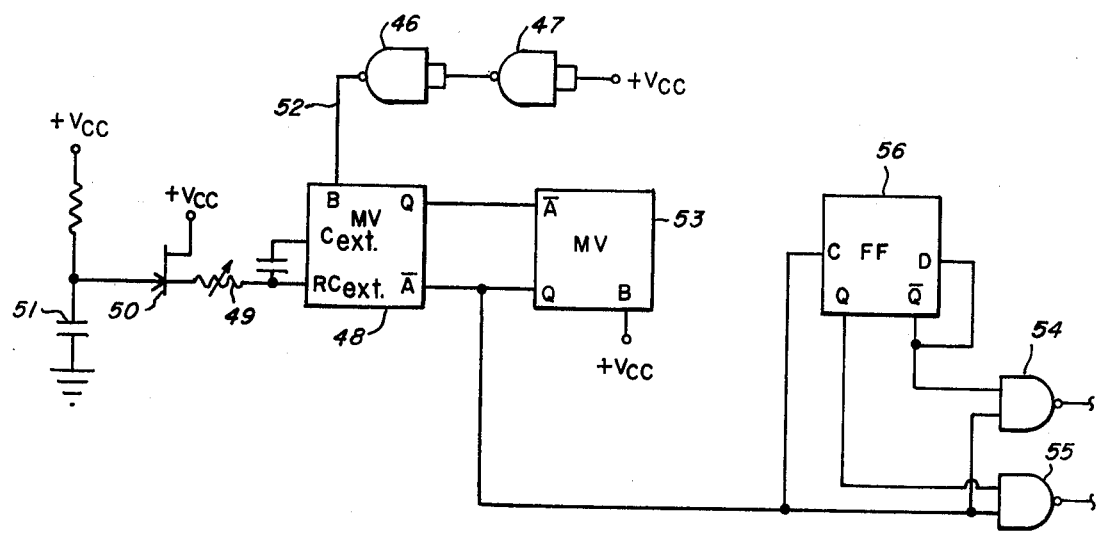
FIG. 4 is a logic diagram of another embodiment of the invention for use with a single phase induction motor.

Referring now to FIG. 4 there is shown an embodiment of the invention for use with a single phase motor having a single motor winding. In FIG. 4 NAND gates 46 and 47, connected as inseries inverters, trigger multivibrator 48 at power-up. In this embodiment the period of multivibrator 48 is gradually decreased at power-up. The timing input to multivibrator 48 coupled from a potentiometer 49 is in series with a field effect transistor 50 which may be a 2N4393 transistor or its equivalent. The gate of transistor 50 connects to charging capacitor 51 which charges up rather slowly at power-up.

With the use of the timing circuit including transistor 50 the starting of small synchronous timing motors is facilitated especially when the speed of the drive is set near twice what is normal for the particular motor. Because the relatively small "on" resistance of transistor 50 makes a negligible contribution to the period of the drive signal, when capacitor 51 is fully charged the accuracy of the drive is not degraded.

At power-up, the signal on line 52 becomes high triggering multivibrator 48. The Q output of multivibrator 48 is therefore in its high state and this signal is coupled to a control input of multivibrator 53 referred to as the A input. This positive-going signal does not operate multivibrator 53 and the Q output of multivibrator 53 is maintained at its low state inhibiting gates 54 and 55. Flip-flop 56 is also not yet operated. The particular initial state of flip-flop 56 makes no difference to the sequence of operation. At the end of the period of multivibrator 48 the Q output of this multivibrator triggers multivibrator 53 on a negative-going edge. Thus, the Q output from multivibrator 53 goes to its high state enabling gates 54 and 55. At the same time the flip-flop 56 is clocked to a position wherein only one of the gates 54 or 55 will have an enabled output. After multivibrator 53 has its period terminated multivibrator 48 is again triggered by the signal to its A input coupled from the Q output of multivibrator 53. This action continues in a cyclical manner but when the flip-flop 56 is again clocked then a different one of the two gates 54 and 55 will be enabled.

The logic is meant to provide an enabling (low) signal alternately from the gates 54 and 55 with a dwell or off-time period wherein neither of the gates are enabled. With the arrangement shown in FIG. 4 only a single high voltage switch is used and thus in the embodiment shown in FIG. 2B the signals from the gates 54 and 55 might be coupled respectively to the inputs I1 and I2 for selectively connecting the positive and negative busses to the single winding.

In FIG. 4 the variable period T2 (refer to one of the signals such as signal 20 in FIG. 1) corresponds to the period of multivibrator 48. While multivibrator 48 is activated both of the gates 54 and 55 are inhibited. Thus, by controlling the length of the period of multivibrator 48 one can control the period T2. The period T1 corresponds to one half the period of multivibrator 53. The period T2 can be adjusted quite easily by varying the setting of potentiometer of 49.

Having described the limited number of embodiments of the present invention, it should now become apparent to those skilled in the art that numerous other embodiments exist, all of which are contemplated as falling within the scope of this invention. For example, the teachings of this invention can be easily extended for controlling motors having more than two windings. For example, with three motor windings there are three high voltage switches which are controlled in a sequence like that shown by the waveforms 20 and 21 in FIG. 1. However, with three phases there are three control signals and thus with regard to the logic shown in FIG. 3 an additional output from the shift registers 30 and 31 is used. Also, in accordance with this invention in one embodiment system can be used as disclosed whereas in another embodiment a different or even a conventional converter 11 may be used in association with the duty cycle speed control aspect of the invention.

What is claimed is:

1. Apparatus for controlling the speed of an AC motor having at least one winding comprising:
   means for providing a pair of DC voltage levels,
   voltage switch means coupled from the converter means receiving the DC voltage levels and having an output coupling to the said at least one winding, said voltage switch means having at least a pair of control inputs,
   and speed control means coupled to said control inputs and comprising first means for providing a first control signal of first width coupled to one of the control inputs, second means for providing a second control signal of second width coupled to the other control input, and means for controlling the control signals to the voltage switch means to provide an off-time period wherein there is an absence of both control signals including means for adjusting the length of said off-time period to control motor speed., 2. Apparatus as set forth in claim 1 wherein said means for converting includes means for providing DC voltage levels of opposite polarity.

3. Apparatus as set forth in claim 1 wherein said first control signal is operative to control the voltage switch means to drive the winding with a current of one sense whereas said second control signal is operative to control the voltage switch means to drive the winding with a current of an opposite sense.

4. Apparatus as set forth in claim 1 wherein said pair of control signals are both square wave signals that are exclusive of each other, one of said control signals for coupling one polarity DC level to the winding and the other of said control signals for coupling the opposite polarity DC level to the winding.

5. Apparatus as set forth in claim 4 for controlling a motor having at least two windings and including two voltage switches each having a pair of control inputs, said control means including means for providing a first pair of control outputs for respectively controlling the first and second voltage switches to couple out-of-phase control signals to the windings and a second pair of control outputs for respectively controlling the first and second voltage switches to couple out-of-phase opposite polarity control signals to the windings.

6. Apparatus as set forth in claim 5 wherein said control means comprises a pair of registers one of which has the first pair of control outputs and the other of which has the second pair of control outputs.

7. Apparatus as set forth in claim 1 wherein said control means includes means for generating at least two square wave signals, one of said square wave signals coupling to one of said control inputs and the other square wave signal coupling to the other of said control inputs.

8. Apparatus as set forth in claim 7 wherein said off-time period is between square wave signals.

9. Apparatus as set forth in claim 8 wherein said control means comprises adjustable multivibrator means for varying the off-time period to increase the period for slower speed control and to decrease the period for faster speed control.

10. Apparatus as set forth in claim 1 wherein said converting means includes capacitor surge current limiting means comprising a zero voltage switch.

11. A circuit for converting an alternating signal to a pair of opposite polarity DC signals for driving a voltage switch means which in turn drives at least one winding of a motor, said circuit comprising:
    input means for receiving an alternating signal,
    AC electronic switch means,
    a bridge circuit,
    means for coupling the AC electronic switch means to the bridge circuit,
    zero voltage switch means having an output to control the AC electronic switch means,
    and means for enabling the zero voltage switch means after a predetermined delay period from the time that the alternating signal is initiated.

12. Apparatus as set forth in claim 1 wherein the first and second control signals are of substantially the same width with the width of the signals being maintained constant and the off-time period variable to control motor speed.

13. Apparatus as set forth in claim 1 wherein said first means comprises logic gate means and said second means comprises logic gate means, said means for controlling the control signals comprising multivibrator means.

14. Apparatus as set forth in claim 1 wherein said first means comprises counter means and said second means comprises counter means, said means for controlling the control signals comprising multivibrator means.

15. A method of driving a winding of an AC motor and controlling the speed of operation of the motor, comprising the steps of;
    driving the winding with a current of a first sense for a first period of time,
    terminating the first sense current for a second period of time considered as an off-time period,
    driving the winding with a current of an opposite sense for a third period of time,
    controlling the speed by adjusting the second period to alter both the frequency of the signal and the duty cycle of operation.

16. A method as set forth in claim 15 including the step of terminating the opposite sense current for a fourth period of time also considered as an off-time period.

* * * * *